(12) United States Patent
Väänänen et al.

(10) Patent No.: US 10,122,280 B1
(45) Date of Patent: Nov. 6, 2018

(54) LOOP CONTROL COEFFICIENTS IN A BUCK CONVERTER

(71) Applicant: TEXAS INSTRUMENTS INCORPORATED, Dallas, TX (US)

(72) Inventors: Ari Kalevi Väänänen, Oulu (FI); Jussi Matti Aleksi Särkkä, Oulunsalso (FI)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/854,120

(22) Filed: Dec. 26, 2017

(51) Int. Cl.
*H02M 3/158* (2006.01)
*H02M 1/42* (2007.01)
*G05F 1/575* (2006.01)
*H02M 3/156* (2006.01)
*H02M 3/157* (2006.01)

(52) U.S. Cl.
CPC .......... *H02M 3/1582* (2013.01); *G05F 1/575* (2013.01); *H02M 1/4208* (2013.01); *H02M 3/157* (2013.01); *H02M 3/1563* (2013.01)

(58) Field of Classification Search
CPC .... H02M 3/155; H02M 3/158; H02M 3/1582; H02M 3/157; H02M 3/135; H02M 3/145
USPC ....... 323/259, 265, 271, 282, 283, 284, 285, 323/351
See application file for complete search history.

(56) References Cited

U.S. PATENT DOCUMENTS

| | | | | |
|---|---|---|---|---|
| 6,456,050 | B1* | 9/2002 | Agiman | H02M 3/1563 323/282 |
| 7,893,665 | B2* | 2/2011 | Belch | H02M 3/1582 323/222 |
| 9,444,342 | B2* | 9/2016 | Childs | H02M 3/156 |
| 9,882,485 | B2* | 1/2018 | Trichy | H02M 3/158 |
| 2007/0013356 | A1* | 1/2007 | Qiu | H02M 3/1584 323/288 |
| 2012/0019226 | A1* | 1/2012 | Wiktor | H02M 3/156 323/285 |
| 2013/0207627 | A1* | 8/2013 | Kahn | G05F 1/46 323/271 |
| 2013/0249511 | A1* | 9/2013 | Kalje | G05F 1/10 323/271 |
| 2014/0002047 | A1* | 1/2014 | Houston | H02M 3/156 323/283 |
| 2014/0218001 | A1* | 8/2014 | Dally | G05F 1/618 323/285 |
| 2015/0188425 | A1* | 7/2015 | Chang | H02M 3/158 323/271 |

(Continued)

*Primary Examiner* — Adolf Berhane
(74) *Attorney, Agent, or Firm* — Tuenlap D. Chan; Charles A. Brill; Frank D. Cimino

(57) ABSTRACT

A buck converter includes a high side transistor, a low side transistor, and a controller. The high side transistor is configured to, when ON, connect an inductor to an input signal. The low side transistor is configured to, when ON, connect the inductor to ground. The controller is configured to control the high side transistor and the low side transistor. The controller has a comparator that includes a first input pair that includes a first transistor, a second transistor, a third transistor, a fourth transistor, a first switch, and a second switch connected such that, when the first switch is closed and the second switch is open, a total gain of the first input pair is one relative to other input pairs and, when the second switch is closed and the first switch is open, the total gain of the first input pair is two relative to other input pairs.

20 Claims, 2 Drawing Sheets

(56) References Cited

U.S. PATENT DOCUMENTS

2017/0373596 A1\* 12/2017 Huang .................. H02M 3/158
2018/0145589 A1\* 5/2018 Labbe ................... H02M 3/156

\* cited by examiner

LOOP CONTROL COEFFICIENTS IN A BUCK CONVERTER

BACKGROUND

Buck converters are voltage step down direct current (DC) to DC converters that convert an input signal at a first voltage to an output signal at a second lower voltage while increasing the current in the output signal to power a load. Multiphase buck converters place multiple buck converters in parallel between the input signal and the load. Each of these converters are turned on at equal intervals over a switching period. Thus, a multiphase buck converter is able to respond to load changes quickly. Multiphase buck converters can be utilized to power many different types of electronics (e.g., a central processing unit (CPU), a power application processor of a mobile phone, computer peripherals, monitors, televisions, set top boxes, etc.).

SUMMARY

In accordance with at least one embodiment of the disclosure, a buck converter includes a high side power transistor, a low side power transistor, and a controller. The high side power transistor is configured to, when ON, connect an inductor to an input signal. The low side power transistor is configured to, when ON, connect the inductor to ground. The controller is configured to control the high side power transistor and the low side power transistor. The controller has a feedback comparator that includes a first input pair that includes a first transistor, a second transistor, a third transistor, a fourth transistor, a first switch, and a second switch connected such that, when the first switch is closed and the second switch is open, a total gain of the first input pair is one relative to a second input pair and, when the second switch is closed and the first switch is open, the total gain of the first input pair is two relative to the second input pair.

Another illustrative embodiment is a comparator that includes a first transistor, a second transistor, a third transistor, a fourth transistor, a first switch, and a second switch. The first transistor includes a first gate, a first source, and a first drain. The first gate is configured to receive a feedback signal. The second transistor including a second gate, a second source, and a second drain. The second gate is configured to receive the feedback signal. The second drain is connected to the first drain. The third transistor includes a third gate, a third source, and a third drain. The fourth transistor includes a fourth gate, a fourth source, and a fourth drain. The fourth gate is configured to receive the reference signal. The fourth drain is connected to the third drain. The first switch includes a first terminal and a second terminal. The first terminal is connected to the second gate, and the second terminal is connected to the third gate. The second switch includes a third terminal and a fourth terminal. The third terminal is connected to the third gate, and the fourth terminal is connected to the fourth gate.

Yet another illustrative embodiment is a buck converter includes a high side power transistor, a low side power transistor, and a controller. The high side power transistor is configured to, when ON, connect an inductor to an input signal. The low side power transistor is configured to, when ON, connect the inductor to ground. The controller is configured to control the high side power transistor and the low side power transistor. The controller has a feedback comparator that includes a first input pair that includes a first transistor, a second transistor, a third transistor, a fourth transistor, a first switch, and a second switch. The first transistor includes a first gate, a first source, and a first drain. The first gate is configured to receive a feedback signal. The second transistor including a second gate, a second source, and a second drain. The second gate is configured to receive the feedback signal. The second drain is connected to the first drain. The third transistor includes a third gate, a third source, and a third drain. The fourth transistor includes a fourth gate, a fourth source, and a fourth drain. The fourth gate is configured to receive the reference signal. The fourth drain is connected to the third drain. The first switch includes a first terminal and a second terminal. The first terminal is connected to the second gate, and the second terminal is connected to the third gate. The second switch includes a third terminal and a fourth terminal. The third terminal is connected to the third gate, and the fourth terminal is connected to the fourth gate.

BRIEF DESCRIPTION OF THE DRAWINGS

For a detailed description of various examples, reference will now be made to the accompanying drawings in which.

NOTATION AND NOMENCLATURE

Figure 1:
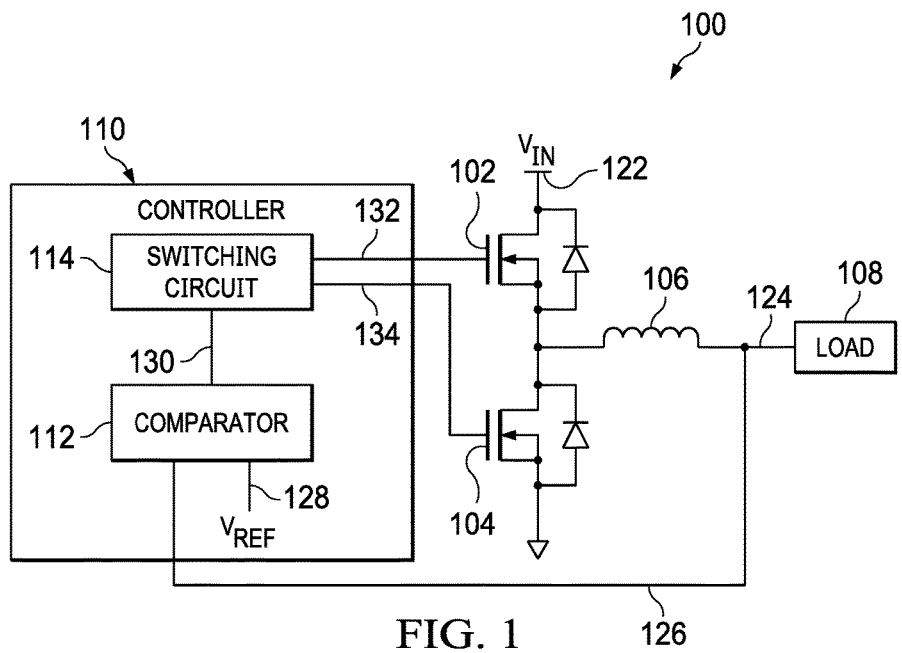
FIG. 1 shows an illustrative circuit diagram of a buck converter in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Buck converters are voltage step down direct current (DC) to DC converters that convert an input signal at a first voltage to an output signal at a second lower voltage while increasing the current in the output signal to power a load.

Multiphase buck converters place multiple buck converters in parallel between the input signal and the load. Each of these converters are turned on at equal intervals over a switching period. Thus, a multiphase buck converter is able to respond to load changes quickly. Multiphase buck converters can be utilized to power many different types of electronics (e.g., a central processing unit (CPU), a power application processor of a mobile phone, computer peripherals, monitors, televisions, set top boxes, etc.).

It is advantageous to be able to program the loop coefficients (gain) of different feedback loops (e.g., output voltage feedback, modulating ramp/emulated current sense, and/or current balance feedback) depending on, for example, the number of phases active, the operating voltages, switching frequency, output capacitance, or inductor inductance. In other words, the bandwidth of the control loop changes or may be required to change to ensure stability depending on many parameters. More particularly, while it is possible to achieve stability in all conditions without programmable loop coefficients, the loop coefficients will not be optimal in many situations because the loop coefficients will need to be set to provide stability under a worst case scenario. In conventional systems, each of the feedback loops are programmed separately by varying the gain in the feedback signals coming into the feedback comparator, thus, requiring several different circuits in several different analog blocks. Thus, it would be desirable for a buck converter, or any other switching converter (e.g., boost, buck-boost, etc.), to be programmable in a single analog block to reduce power use and increase efficiency.

In accordance with various examples, a buck converter, or other switching converter (e.g., boost, buck-boost, etc.) is provided that includes a programmable feedback comparator. The loop coefficients are programmable through the differential input pairs of the comparator. More particularly, the input pair gain is programmed by connecting the gates of the input pair transistors to either the same input signal (e.g., the feedback signal), thus rendering the differential gain of the two input pair transistors as zero and therefore, the total gain of the input pair relative to other input pairs in the comparator to one or by connecting the gates of the input pair of transistors to different input signals (e.g., the feedback signal and a reference signal), thus providing a total differential gain of two. The term "gain" as used herein, refers to the gain relative to the other input pairs gain, not to absolute gain. In some embodiments, each input pair is portioned into pieces allowing the total gain of that input pair to be programmed in steps. Each input pair is programmable separately so that the gains of different parameters (e.g., output voltage feedback, modulating ramp/emulated current sense, and/or current balance feedback) can each be adjusted relative to each other.

Because the loop coefficients are all programmable within the feedback comparator without the requirement of varying the gains of the signals coming into the feedback comparator as in conventional systems, only a single analog structure is needed to program all the loop coefficients. Furthermore, because the input signals into the feedback comparator are not changed to program the gain, input signal dynamic range problems are avoided. For example, in conventional systems programming a compensating ramp signal to be steeper may cause the amplitude to increase over the dynamic range of the feedback comparator input; however, by programming the gain within the feedback comparator itself, there is no need to compensate the incoming ramp signal. Furthermore, this loop coefficient programming is precise and stable over temperature, input voltage, time, process, etc. variation because it relies on the matching of transistors in the input pairs.

FIG. 1 shows an illustrative circuit diagram of a buck converter 100 in accordance with various examples. The buck converter 100 includes, in an embodiment, a high side power transistor 102, a low side power transistor 104, an inductor 106, and a controller 110 to power a load 108. In some embodiments, buck converter 100 is configured to generate one phase of a plurality of phases (e.g., 1 phase of 8 phases) of the output signal to drive load 108. Switching circuit 114 of the controller 110 is configured to generate a high side control signal 132 and a low side control signal 134. The high side control signal 132 controls when the high side power transistor 102 is ON and OFF. When the high side power transistor 102 is ON (and thus the low side power transistor 104 is OFF), the input signal 122, which is received at a first voltage (e.g., 12V), is connected to inductor 106. In other words, the high side power transistor 102 is configured to, when ON, connect the inductor 106 to the input signal 122. More particularly, when the high side power transistor 102 turns ON and the low side power transistor 104 is OFF, the current through the inductor 106 increases. Hence, the inductor 106 generates an opposing voltage. The drop in voltage across the inductor 106 counteracts the voltage in the input signal 122, thus decreasing the voltage in the output signal 124 powering load 108.

The low side control signal 134 controls when the low side power transistor 104 is ON and OFF. When the low side power transistor 104 is ON (and thus the high side power transistor 102 is OFF), the inductor 106 is connected to ground. In other words, the low side power transistor 104 is configured to, when ON, connect the inductor 106 to ground. More particularly, when the high side power transistor 102 turns OFF (by the high side control signal 132), and the low side power transistor 104 turns ON (by the low side control signal 134), the input voltage 122 is removed from the load 108. The decreasing current through the inductor 106 from the input signal 122 causes the stored energy in the inductor 106's magnetic field to support current flow in the output signal 124 through the load 108. This current, in addition to the current through the load 108 when the high side power transistor 102 is ON, is greater than the average current in the input signal 122. Therefore, the output signal 124 is a lower voltage than the voltage in the input signal 122, but the current in the output signal 124 is greater than the average current in the input signal 122 to power the load 108.

In some embodiments, the high side power transistor 102 and the low side power transistor 104 are n-channel metal-oxide-semiconductor field-effect (NMOS) transistors operating in the enhancement mode. However, in alternative embodiments, the high side power transistor 102 and the low side power transistor 104 can be any power transistor including NMOS transistors operating in depletion mode, p-channel metal-oxide-semiconductor field-effect (PMOS) transistors operating in the enhancement mode or the depletion mode, bipolar junction transistors (BJTs), or any combination thereof.

To control the voltage in the output signal 124 (so as to maintain a constant desired voltage and current), feedback signal 126 (which is the output signal 124) is provided back to the controller 110, and more particularly to the feedback comparator 112 of the controller 110. Feedback comparator 112 acts to compare the feedback signal 126 with a reference signal 128. In some embodiments, the comparator 112 compares at least the voltage in the feedback signal 126 with the voltage in the reference signal 128 to generate the comparator output signal 130. For example, if the voltage in the feedback signal 126 is greater than the voltage in the reference signal 128, the comparator output signal 130 will provide an indication that the switching circuit 114 is to generate a high control signal 132 that causes the high side power transistor 102 to turn and/or remain OFF and to generate a low control signal 134 that causes the low side power transistor 104 to turn and/or remain ON. However, if the voltage in the feedback signal 126 is less than the voltage in the reference signal 128, the comparator output signal 130 will provide an indication that the switching circuit 114 is to generate a high control signal 132 that causes the high side power transistor 102 to turn and/or remain ON and to generate a low control signal 134 that causes the low side power transistor 104 to turn and/or remain OFF.

To account for the number of phases active and the operating voltages of the buck converter 100, other parameters are also compared by the comparator 112 to ensure and/or provide stability for the system. For example, the comparator 112 can compare the phase current signal (not shown) with a current reference (not shown) to provide current balancing and/or compare the modulation ramp/emulated current sense (not shown) with a reference. In other words, the comparator 112 is capable, in an embodiment, of accounting for multiple different feedback parameters in a single comparator. Thus, the different loop control coefficients for the various parameters are programmable within the comparator 128. In this way, the buck converter 100 is able to regulate the output signal 124 in a stable manner while keeping the bandwidth of the regulator optimal.

Figure 2:
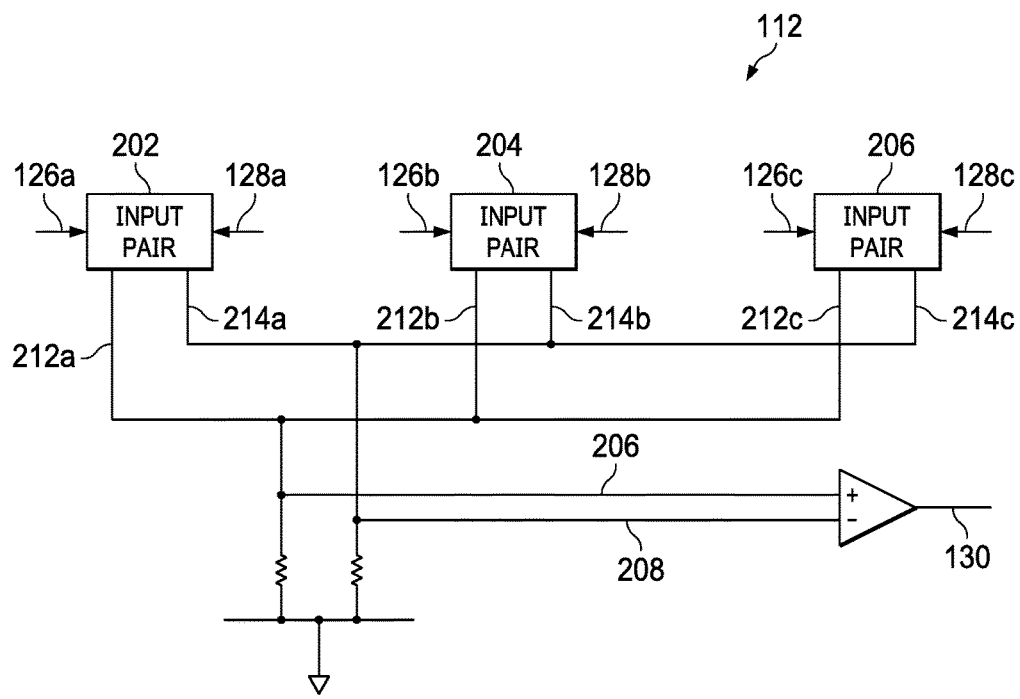
FIG. 2 shows an illustrative circuit diagram of a feedback comparator that is included in a controller of a buck converter in accordance with various examples.

FIG. 2 shows an illustrative circuit diagram of feedback comparator 112 that is included in controller 110 of buck converter 100 in accordance with various examples. In the example shown in FIG. 2, there are three differential input pairs 202-206 (differential pair of transistors), each of which may correspond with a different feedback parameter to be compared. For example, input pair 202 can correspond with an output voltage feedback; input pair 204 can correspond with a modulating ramp feedback; and input pair 206 can correspond with a current balance feedback. Thus, the input signals for the input pair 202 include the feedback signal 126a and the reference signal 128a, the input signals for the input pair 204 include the feedback signal 126b and the reference signal 128b, and the input signals for the input pair 206 include the feedback signal 126c and the reference signal 128c. Each input pair 202-206 is, in an embodiment, programmed separately, thus, the input pairs 202-206 can have different gains. Furthermore, each input pair 202-206 generates a differential output. For example, input pair 202 generates output signals 212a and 214a, input pair 204 generates output signals 212b and 214b, and input pair 206 generates output signals 212c and 214c. The positive output signals (e.g., 212a-212c) then are combined into a single positive combined signal 206. Similarly, the negative output signals (e.g., 214a-214c) are combined into a single negative combined signal 208. The positive combined signal 206 is then, in an embodiment, compared with the negative combined input signal 208 to generate the comparator output signal 130 which is used to generate the high side control signal 132 and the low side control signal 134 as discussed above.

Figure 3:
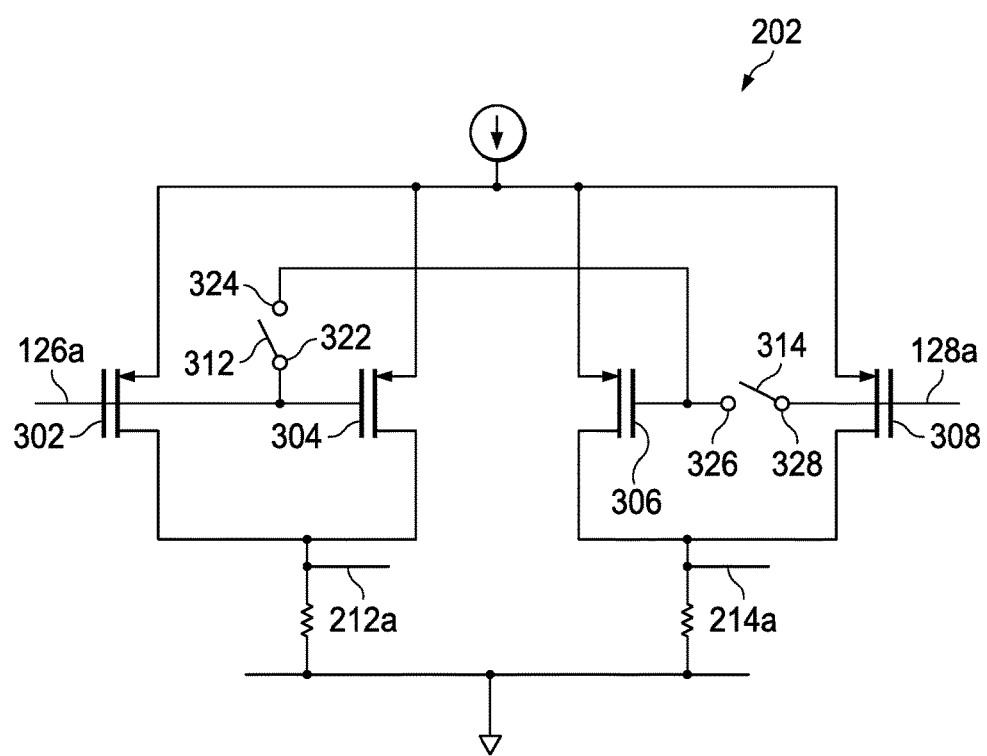
FIG. 3 shows an illustrative circuit diagram of an input pair of a feedback comparator that is included in a controller of a buck converter in accordance with various examples.

FIG. 3 shows an illustrative circuit diagram of input pair 202 of feedback comparator 112 in accordance with various examples. While only input pair 202 is shown, each of the input pairs 204-206 can contain similar components and connections. Thus, each input pair 202-206 can be programmed independently to have different and/or the same gains.

The input pair 202, in an embodiment, includes transistors 302-308, and switches 312-314. In an embodiment, each of the transistors 302-308 are PMOS transistors; however, in other embodiments, the transistors 302-308 may be any other type of transistors (e.g., NMOS transistors, BJTs, etc.) or any combination of transistor types. The gate of transistor 302 is configured to receive the feedback signal 126a. The source of transistor 302 is connected to the source of transistor 304, the source of transistor 306, and the source of transistor 308. The drain of transistor 302 is connected to the drain of transistor 304 which generate the positive output signal 212a. The gate of transistor 302 is connected to terminal 322 of switch 312 and the gate of transistor 304. Therefore, the gate of transistor 304 is configured to receive the feedback signal 126a as well.

The gate of transistor 308 is configured to receive the reference signal 128a. The source of transistor 308 is connected to the source of transistor 302, the source of transistor 304, and the source of transistor 306. The drain of transistor 308 is connected to the drain of transistor 306 which generate the negative output signal 214a. The gate of transistor 308 is connected to terminal 328 of switch 314, and the gate of transistor 306 is connected to the terminal 326 of switch 314. Therefore, when switch 314 is closed, the gate of transistor 308 is connected to the gate of transistor 306. The terminal 324 of switch 312 is connected to the gate of transistor 306, and, as discussed above, the terminal 322 is connected to the gate of transistor 302; therefore, when switch 312 is closed, the gate of transistor 302 is connected to the gate of transistor 306.

In the configuration shown in FIG. 3, when switch 312 is closed and switch 314 is open, the gate of transistor 306 is configured to receive the feedback signal 126a. Thus, both sides of the input pair 202 receive the feedback signal 126a and the total gain of the input pair 202 relative to other input pairs is one because transistor 304 and transistor 306 both conduct the same current and a differential input signal will not cause a difference in the currents of these transistors. However, when switch 314 is closed and switch 312 is open, the gate of transistor 306 is configured to receive the reference signal 128a. Thus, the gain of the input pair 202 relative to the other input pairs is two because all of the transistors 302-308 have a differential gain. Therefore, by controlling the switches 312 and 314 the differential gain of the input pair 202 is modulated. In other words, the gain (loop coefficient) of the input pair 202 is programmable in the comparator 112 through the control of switches 312-314. Multiple different gain settings and gain steps can be achieved by varying the number of input pair transistors and switches in the input pairs.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:
1. A buck converter, comprising:
    a high side power transistor configured to, when ON, connect an inductor to an input signal;
    a low side power transistor configured to, when ON, connect the inductor to ground; and a controller configured to control the high side power transistor and the low side power transistor, the controller having a feedback comparator that includes a first input pair comprising a first transistor, a second transistor, a third transistor, a fourth transistor, a first switch, and second switch connected such that:
  when the first switch is closed and the second switch is open, a total gain of the first input pair is one relative to a second input pair; and
  when the second switch is closed and the first switch is open, the total gain of the first input pair is two relative to the second input pair.

2. The buck converter of claim 1, wherein the feedback comparator further includes a third input pair comprising a fifth transistor, a sixth transistor, a seventh transistor, an eighth transistor, a third switch, and fourth switch connected such that:
  when the third switch is closed and the fourth switch is open, a total gain of the second input pair is one relative to the second input pair; and
  when the fourth switch is closed and the second switch is open, the total gain of the second input pair is two relative to the second input pair.

3. The buck converter of claim 2, wherein the feedback comparator further includes a fourth input pair comprising a ninth transistor, a tenth transistor, an eleventh transistor, a twelfth transistor, a fifth switch, and sixth switch connected such that:
  when the fifth switch is closed and the sixth switch is open, a total gain of the third input pair is one relative to the second input pair; and
  when the sixth switch is closed and the fifth switch is open, the total gain of the third input pair is two relative to the second input pair.

4. The buck converter of claim 3, wherein the first input pair generates a first output signal and a second output signal, the third input pair generates a third output signal, and a fourth output signal, and the fourth input pair generates a fifth output signal and a sixth output signal.

5. The buck converter of claim 4, wherein the feedback comparator is further configured to combine the first output signal, the third output signal, and the fourth output signal to generate a positive combined signal and combine the second output signal, the fourth output signal, and the sixth output signal to generate a negative combined signal.

6. The buck converter of claim 5, wherein the feedback comparator is further configured to compare the positive combined signal and the negative combined signal to generate the comparator output signal.

7. The buck converter of claim 4, wherein the first input pair corresponds with an output voltage feedback, the third input pair corresponds with a modulating ramp feedback, and the fourth input pair corresponds with a current balance feedback.

8. The buck converter of claim 1, wherein the second switch connects between a gate of the third transistor to a gate of the fourth transistor.

9. The buck converter of claim 8, wherein the first switch connects between a gate of the second transistor and the gate of the third transistor.

10. A comparator, comprising:
  a first transistor including a first gate, a first source, and a first drain, the first gate configured to receive a feedback signal;
  a second transistor including a second gate, a second source, and a second drain, the second gate configured to receive the feedback signal and wherein the second drain is connected to the first drain;
  a third transistor including a third gate, a third source, and a third drain;
  a fourth transistor including a fourth gate, a fourth source, and a fourth drain, the fourth gate configured to receive the reference signal and wherein the fourth drain is connected to the third drain;
  a first switch including a first terminal and a second terminal, the first terminal connected to the second gate and the second terminal connected to the third gate; and
  a second switch including a third terminal and a fourth terminal, the third terminal connected to the third gate and the fourth terminal connected to the fourth gate.

11. The comparator of claim 10, wherein, when the first switch is closed, the third gate is configured to receive the feedback signal.

12. The comparator of claim 11, wherein, when the second switch is closed, the third gate is configured to receive the reference signal.

13. The comparator of claim 11, wherein the first terminal is further connected to the first gate.

14. The comparator converter of claim 13, wherein the second terminal is further connected to the third terminal.

15. The comparator of claim 11, wherein the first source is connected to the second source, the third source, and the fourth source.

16. The comparator of claim 14, wherein the first drain and second drain are configured to generate a positive output signal and the third drain and fourth drain are configured to generate a negative output signal.

17. The comparator of claim 15, wherein the first transistor, the second transistor, the third transistor, and the fourth transistor are p-channel metal-oxide-semiconductor field-effect (PMOS) transistors.

18. A buck converter, comprising:
  a high side power transistor configured to, when ON, connect an inductor to an input signal;
  a low side power transistor configured to, when ON, connect the inductor to ground; and
  a controller configured to control the high side power transistor and the low side power transistor, the controller having a feedback comparator that includes:
    a first transistor including a first gate, a first source, and a first drain, the first gate configured to receive a feedback signal;
    a second transistor comprising including a second gate, a second source, and a second drain, the second gate configured to receive the feedback signal and wherein the second drain is connected to the first drain;
    a third transistor including a third gate, a third source, and a third drain;
    a fourth transistor including a fourth gate, a fourth source, and a fourth drain, the fourth gate configured to receive the reference signal and wherein the fourth drain is connected to the third drain;
    a first switch including a first terminal and a second terminal, the first terminal connected to the second gate and the second terminal connected to the third gate; and
    a second switch including a third terminal and a fourth terminal, the third terminal connected to the third gate and the fourth terminal connected to the fourth gate.

19. The buck converter of claim 18, when the first switch is closed, the third gate is configured to receive the feedback signal.

20. The buck converter of claim 19, wherein, when the second switch is closed, the third gate is configured to receive the reference signal.

* * * * *